(12) United States Patent
Aoki et al.

(10) Patent No.: US 9,657,168 B2
(45) Date of Patent: May 23, 2017

(54) THERMOPLASTIC TRANSPARENT RESIN COMPOSITION

(75) Inventors: Yoshio Aoki, Kanagawa (JP); Kazuya Sato, Kanagawa (JP); Hiroki Oguro, Kanagawa (JP); Nobuyuki Koike, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 85 days.

(21) Appl. No.: 13/642,936

(22) PCT Filed: May 2, 2011

(86) PCT No.: PCT/JP2011/060549
§ 371 (c)(1),
(2), (4) Date: Nov. 19, 2012

(87) PCT Pub. No.: WO2011/138953
PCT Pub. Date: Nov. 10, 2011

(65) Prior Publication Data
US 2013/0059980 A1 Mar. 7, 2013

(30) Foreign Application Priority Data

May 7, 2010 (JP) .................................. 2010-107211

(51) Int. Cl.
| | | |
|---|---|---|
| C08L 33/00 | (2006.01) | |
| C08L 33/12 | (2006.01) | |
| C08L 25/14 | (2006.01) | |
| G11B 7/2533 | (2013.01) | |
| C08F 220/14 | (2006.01) | |

(52) U.S. Cl.
CPC ............ *C08L 33/12* (2013.01); *C08F 220/14* (2013.01); *C08L 25/14* (2013.01); *G11B 7/2533* (2013.01)

(58) Field of Classification Search
CPC ...................................................... C08L 25/14
See application file for complete search history.

(56) References Cited

U.S. PATENT DOCUMENTS

| | | | | |
|---|---|---|---|---|
| 4,558,098 A | * | 12/1985 | Kamata .................... | C08L 33/12 525/207 |
| 4,911,966 A | * | 3/1990 | Murayama et al. ......... | 428/65.1 |
| 7,488,782 B2 | | 2/2009 | Sugano et al. | |
| 2003/0026936 A1 | * | 2/2003 | Kido et al. .................. | 428/64.4 |
| 2006/0205886 A1 | * | 9/2006 | Yamauchi et al. ............ | 525/314 |
| 2007/0185277 A1 | | 8/2007 | Sugano et al. | |
| 2007/0269670 A1 | * | 11/2007 | Wilmer .................. | G11B 7/253 428/500 |
| 2008/0213606 A1 | * | 9/2008 | Saegusa .............. | B29C 47/0021 428/500 |
| 2008/0213608 A1 | | 9/2008 | Richardson et al. | |
| 2011/0244242 A1 | * | 10/2011 | Oguro et al. ................. | 428/412 |
| 2011/0269912 A1 | * | 11/2011 | Kushida et al. ........... | 525/330.3 |

FOREIGN PATENT DOCUMENTS

| | | |
|---|---|---|
| EP | 1757626 | 2/2007 |
| EP | 1834965 | 9/2007 |
| JP | 1-132603 | 5/1989 |
| JP | 01-315445 | 12/1989 |
| JP | 02-196853 | 8/1990 |
| JP | 4-75001 | 3/1992 |
| JP | 08-208935 | 8/1996 |
| JP | 3643830 | 4/2005 |
| JP | 2005-530003 | 10/2005 |
| JP | 2006-22211 | 1/2006 |
| JP | 2006-89713 | 4/2006 |
| JP | 2006-299141 | 11/2006 |
| JP | 2009-196125 | 9/2009 |
| WO | 2010/024217 | 3/2010 |

OTHER PUBLICATIONS

China Office action, mail date is Jun. 26, 2014.
Search report from E.P.O. In EP11777472.9, mail date is Sep. 11, 2013.
U.S. Appl. No. 13/704,827 to Kazuya Sato et al., filed Dec. 17, 2012.
U.S. Appl. No. 13/697,882 to Hiroki Oguro et al., filed Nov. 14, 2012.
Search report from International Application No. PCT/JP2011/060549, mail date is May 31, 2011.

* cited by examiner

*Primary Examiner* — Irina Krylova
(74) *Attorney, Agent, or Firm* — Greenblum & Bernstein, P.L.C.

(57) ABSTRACT

To provide a highly transparent thermoplastic resin composition without requiring, for example, a special molecular design or incorporation of an additive, with the refractive index of the composition being readily controllable.
The highly transparent and refractive-index-controllable thermoplastic resin composition can be produced by blending a thermoplastic resin (A) containing a structural unit derived from a (meth)acrylic acid ester monomer represented by a specific chemical formula and a structural unit derived from an aromatic vinyl monomer represented by a specific chemical formula, with a thermoplastic resin (B) obtained by hydrogenating aromatic double bonds of a thermoplastic resin which contains a structural unit derived from a (meth)acrylic acid ester monomer represented by a specific chemical formula and a structural unit derived from an aromatic vinyl monomer represented by a specific chemical formula.

2 Claims, 1 Drawing Sheet

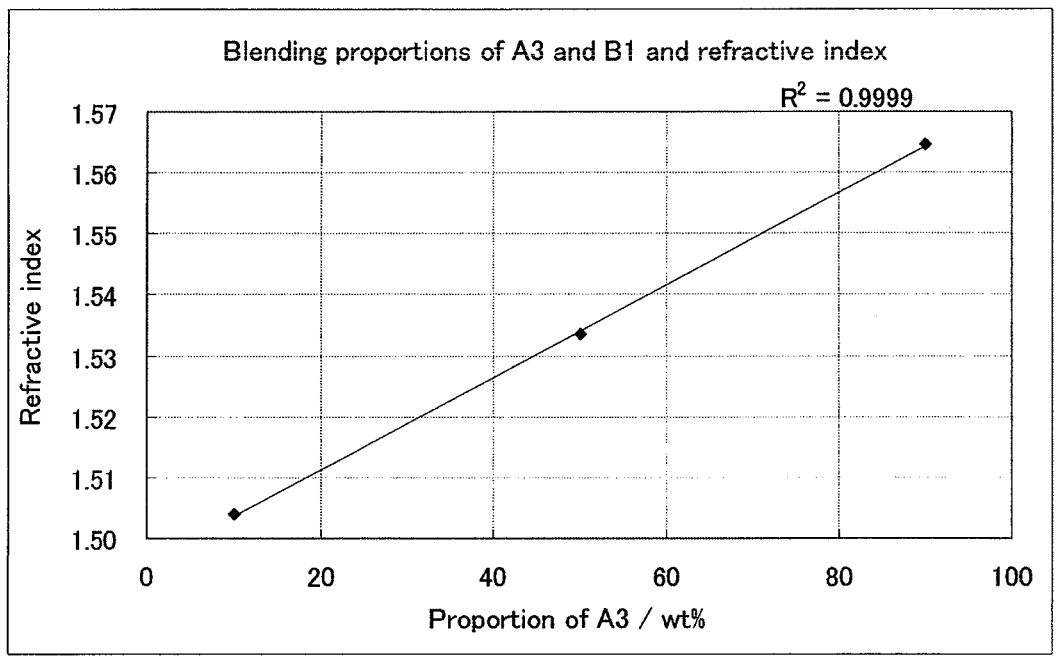

THERMOPLASTIC TRANSPARENT RESIN COMPOSITION

TECHNICAL FIELD

The present invention relates to a thermoplastic resin composition, and more particularly to a thermoplastic transparent resin composition which exhibits excellent transparency and can be employed for producing, for example, various optical components.

BACKGROUND ART

Blending of two or more thermoplastic resins is a widely used technique for improving properties of the resin blend, such as heat resistance, impact resistance, toughness, surface hardness, and hygroscopicity. However, as described in, for example, Patent Document 1, when two or more resins are blended, phase separation may occur in the resultant blend.

As described in Patent Document 2, when phase separation occurs in a resin composition produced through blending of resins, in most cases, the resin composition becomes opaque. In general, in order to produce a transparent resin composition exhibiting a phase separation state, resins having similar refractive indices must be blended.

Production of a transparent resin composition through blending of resins and adjustment of the refractive index of the resin composition are carried out through, for example, a method described in Patent Document 3, in which the composition of a grafted resin is adjusted, or a method described in Patent Document 4, in which refractive index is adjusted by incorporation of an additive.

However, such a conventional method encounters difficulty in producing a highly transparent resin composition whose refractive index is readily adjusted.

PRIOR ART DOCUMENT

Patent Document

Patent Document 1: Japanese Patent Application Laid-Open (kokai) No. 2006-299141
Patent Document 2: Japanese Patent Application Laid-Open (kokai) No. H08-208935
Patent Document 3: Japanese Patent No. 3643830
Patent Document 4: Japanese Kohyo Patent Publication No. 2005-530003

SUMMARY OF THE INVENTION

Problems to be Solved by the Invention

The present invention provides a highly transparent thermoplastic resin composition whose refractive index is readily adjusted.

Means for Solving the Problems

In order to solve the aforementioned problems, the present inventors have conducted extensive studies, and as a result have found that when specific thermoplastic resins are blended, the resins exhibit exceptionally high compatibility with each other, and the resultant thermoplastic resin composition exhibits transparency, and that the refractive index of the resin composition can be readily controlled by merely varying the blending proportions of the thermoplastic resins. Accordingly, the present invention provides the following.

1. A thermoplastic transparent resin composition comprising a thermoplastic resin (A) and a thermoplastic resin (B) blended therewith:

the thermoplastic resin (A) being a thermoplastic resin containing at least one structural unit derived from a (meth)acrylic acid ester monomer represented by the following formula (1) and at least one structural unit derived from an aromatic vinyl monomer represented by the following formula (2), wherein the amount of the (meth)acrylic-acid-ester-monomer-derived structural unit is 1 to 99 mol % on the basis of the total amount of all the structural units of the resin; and the thermoplastic resin (B) obtained by hydrogenating 70% or more of aromatic double bonds of the aromatic-vinyl-monomer-derived structural unit of a thermoplastic resin which contains at least one structural unit derived from a (meth)acrylic acid ester monomer represented by the following formula (1) and at least one structural unit derived from an aromatic vinyl monomer represented by the following formula (2), wherein the amount of the (meth)acrylic-acid-ester-monomer-derived structural unit is 1 to 99 mol % on the basis of the total amount of all the structural units of the resin:

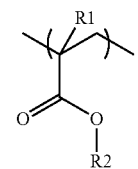

(1)

(wherein R1 represents a hydrogen atom or a methyl group, and R2 represents a C1 to C18 hydrocarbon group); and

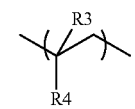

(2)

(wherein R3 represents a hydrogen atom or a methyl group, and R4 represents a phenyl group which may have a C1 to C4 hydrocarbon substituent).

2. A thermoplastic transparent resin composition as described in 1 above, wherein, in the thermoplastic resin (A), the amount of the (meth)acrylic-acid-ester-monomer-derived structural unit represented by formula (1) is 1 to 80 mol % on the basis of the total amount of all the structural units of the resin (A).

3. A thermoplastic transparent resin composition as described in 1 or 2 above, wherein, in the thermoplastic resin (B), the amount of the (meth)acrylic-acid-ester-monomer-derived structural unit represented by formula (1) is 45 to 99 mol % on the basis of the total amount of all the structural units of the resin (B).

4. A thermoplastic transparent resin composition according to any of 1 to 3 above, wherein a piece molded from the composition and having a thickness of 3.2 mm exhibits a haze of 5% or less as measured through the transmission method.

5. A thermoplastic transparent resin composition as described in any of 1 to 4 above, wherein, in formula (1), each of R1 and R2 is a methyl group.

6. A thermoplastic transparent resin composition as described in any of 1 to 5 above, wherein, in formula (2), R3 is a hydrogen atom, and R4 is a phenyl group.

7. A thermoplastic transparent resin composition as described in any of 1 to 6 above, which comprises a thermoplastic resin (A) wherein the amount of the (meth)acrylic-acid-ester-monomer-derived structural unit represented by formula (1) is 15 to 65 mol % on the basis of the total amount of all the structural units of the resin (A), and a thermoplastic resin (B) wherein the amount of the (meth)acrylic-acid-ester-monomer-derived structural unit represented by formula (1) is 55 to 80 mol % on the basis of the total amount of all the structural units of the resin (B), blended therewith.

8. A thermoplastic transparent resin composition as described in 7 above, which comprises a thermoplastic resin (A) wherein the amount of the (meth)acrylic-acid-ester-monomer-derived structural unit represented by formula (1) is 15 to 35 mol % on the basis of the total amount of all the structural units of the resin (A), and a thermoplastic resin (B) wherein the amount of the (meth)acrylic-acid-ester-monomer-derived structural unit represented by formula (1) is 55 mol % or more and less than 65 mol % on the basis of the total amount of all the structural units of the resin (B), blended therewith.

9. A thermoplastic transparent resin composition as described in 8 above, wherein, in the thermoplastic resin (A), the amount of the (meth)acrylic-acid-ester-monomer-derived structural unit represented by formula (1) is 15 to 25 mol % on the basis of the total amount of all the structural units of the resin (A).

10. A thermoplastic transparent resin composition as described in 7 above, which comprises a thermoplastic resin (A) wherein the amount of the (meth)acrylic-acid-ester-monomer-derived structural unit represented by formula (1) is 15 to 65 mol % on the basis of the total amount of all the structural units of the resin (A), and a thermoplastic resin (B) wherein the amount of the (meth)acrylic-acid-ester-mono-mer-derived structural unit represented by formula (1) is 65 to 80 mol % on the basis of the total amount of all the structural units of the resin (B), blended therewith.

11. A thermoplastic transparent resin composition as described in 10 above, wherein, in the thermoplastic resin (A), the amount of the (meth)acrylic-acid-ester-monomer-derived structural unit represented by formula (1) is 15 to 55 mol % on the basis of the total amount of all the structural units of the resin (A).

12. An optical component formed of a thermoplastic transparent resin composition as recited in any of 1 to 11 above.

13. An extrusion-molded thermoplastic resin sheet formed of a thermoplastic transparent resin composition as recited in any of 1 to 11 above.

14. A co-extrusion-molded multi-layer thermoplastic resin sheet comprising a layer formed of a thermoplastic transparent resin composition as recited in any of 1 to 11 above.

15. A light guide plate formed of a thermoplastic resin sheet as recited in 13 or 14 above.

16. A lens unit comprising a substrate formed of a thermoplastic resin sheet as recited in 13 or 14 above, and at least one lens formed on one surface or both surfaces of the substrate.

17. A display front panel formed of a thermoplastic resin sheet as recited in 13 or 14 above.

18. An injection-molded product formed of a thermoplastic transparent resin composition as recited in any of 1 to 11 above.

19. An injection-molded product as described in 18 above, which is a light guide plate, a plastic lens, or an optical recording medium substrate.

Effects of the Invention

According to the present invention, a highly transparent thermoplastic resin composition can be produced by merely blending specific thermoplastic resins without requiring, for example, a special molecular design or incorporation of an additive. Since two resins having different refractive indices can be uniformly blended together while maintaining transparency, the refractive index of the thermoplastic resin composition can be readily adjusted by varying the blending proportions of the resins. The thermoplastic transparent resin composition of the present invention, which has the aforementioned properties, is suitably employed for producing various optical components.

BRIEF DESCRIPTION OF THE DRAWINGS

FIG. 1 shows the relationship between refractive index and the blending proportions of thermoplastic resin (A) and thermoplastic resin (B) in Example 1.

BEST MODES FOR CARRYING OUT THE INVENTION

The thermoplastic transparent resin composition of the present invention contains thermoplastic resin (A) and thermoplastic resin (B) blended therewith.

Thermoplastic resin (A) is a thermoplastic resin containing at least one structural unit derived from a (meth)acrylic acid ester monomer represented by the following formula (1), and at least one structural unit derived from an aromatic vinyl monomer represented by the following formula (2), wherein the amount of the (meth)acrylic-acid-ester-monomer-derived structural unit is 1 to 99 mol % on the basis of the total amount of all the structural units of the resin.

Thermoplastic resin (B) is a thermoplastic resin obtained by hydrogenating 70% or more of aromatic double bonds of the aromatic-vinyl-monomer-derived structural unit of a thermoplastic resin which contains at least one structural unit derived from a (meth)acrylic acid ester monomer represented by the following formula (1), and at least one structural unit derived from an aromatic vinyl monomer represented by the following formula (2), wherein the amount of the (meth)acrylic-acid-ester-monomer-derived structural unit is 1 to 99 mol % on the basis of the total amount of all the structural units of the resin.

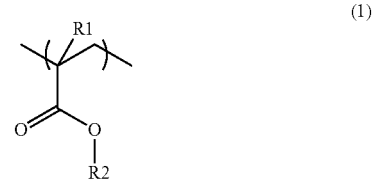

(1)

(In formula (1), R1 represents a hydrogen atom or a methyl group, and R2 represents a C1 to C18 hydrocarbon group.)

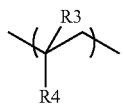

(2)

(In formula (2), R3 represents a hydrogen atom or a methyl group, and R4 represents a phenyl group which may have a C1 to C4 hydrocarbon substituent.)

In the (meth)acrylic-acid-ester-monomer-derived structural unit represented by formula (1), R2 is a C1 to C18 hydrocarbon group. Specific examples of the hydrocarbon group include alkyl groups such as methyl, ethyl, butyl, lauryl, stearyl, cyclohexyl, and isobornyl; and aryl groups such as benzyl and phenyl.

Of these, preferred is a (meth)acrylic-acid-ester-monomer-derived structural unit in which R2 is a methyl group and/or an ethyl group, and more preferred is a methylmethacrylate-derived structural unit in which R1 is a methyl group and R2 is a methyl group.

Thermoplastic resin (A) or thermoplastic resin (B), which contains at least one (meth)acrylic-acid-ester-monomer-derived structural unit represented by formula (1), may contain two or more (meth)acrylic-acid-ester-monomer-derived structural units.

In the aromatic-vinyl-monomer-derived structural unit represented by formula (2), R3 is a hydrogen atom or a methyl group, and R4 is a phenyl group or a phenyl group having a C1 to C4 hydrocarbon substituent. Preferred is a styrene-derived structural unit in which R3 is a hydrogen atom and R4 is a phenyl group.

Thermoplastic resin (A) or a thermoplastic resin before hydrogenation of aromatic double bonds of thermoplastic resin (B) (hereinafter may be referred to as "thermoplastic resin ($B_0$)"), which contains at least one aromatic-vinyl-monomer-derived structural unit represented by formula (2), may contain two or more aromatic-vinyl-monomer-derived structural units.

In thermoplastic resin (A), the amount of the (meth)acrylic-acid-ester-monomer-derived structural unit is 1 to 99 mol %, preferably 1 to 80 mol %, more preferably 1 to 70 mol %, much more preferably 15 to 65 mol %, on the basis of the total amount of all the structural units of thermoplastic resin (A).

When the amount of the (meth)acrylic-acid-ester-monomer-derived structural unit is 1 to 80 mol %, thermoplastic resin (A) exhibits particularly high compatibility with thermoplastic resin (B).

In thermoplastic resin (B), the amount of the (meth)acrylic-acid-ester-monomer-derived structural unit is 1 to 99 mol %, preferably 45 to 99 mol %, more preferably 55 to 99 mol %, much more preferably 55 to 80 mol %, on the basis of the total amount of all the structural units of thermoplastic resin (B).

When the amount of the (meth)acrylic-acid-ester-monomer-derived structural unit is 45 to 99 mol %, thermoplastic resin (B) exhibits particularly high compatibility with thermoplastic resin (A).

Thermoplastic resin (A) or thermoplastic resin ($B_0$), which is employed in the thermoplastic transparent resin composition of the present invention, may be produced through polymerization between a (meth)acrylic acid ester monomer forming the structural unit represented by formula (1) and an aromatic vinyl monomer forming the structural unit represented by formula (2).

Polymerization between a (meth)acrylic acid ester monomer and an aromatic vinyl monomer may be carried out through a known method; for example, bulk polymerization or solution polymerization.

Bulk polymerization is carried out through, for example, a process in which a monomer composition containing the aforementioned monomers and a polymerization initiator is continuously supplied to a complete mixing vessel, and continuous polymerization is performed at 100 to 180° C. The aforementioned monomer composition may optionally contain a chain transfer agent.

No particular limitation is imposed on the polymerization initiator employed. Examples of the polymerization initiator include organic peroxides such as t-amyl peroxy-2-ethylhexanoate, t-butyl peroxy-2-ethylhexanoate, benzoyl peroxide, 1,1-di(t-hexylperoxy)-3,3,5-trimethylcyclohexane, 1,1-di(t-hexylperoxy)cyclohexane, 1,1-di(t-butylperoxy)cyclohexane, t-hexylperoxyisopropyl monocarbonate, t-amyl peroxy-normal-octoate, t-butylperoxyisopropyl monocarbonate, and di-t-butyl peroxide; and azo compounds such as 2,2'-azobisisobutyronitrile, 2,2'-azobis(2-methylbutyronitrile), and 2,2'-azobis(2,4-dimethylvaleronitrile). These polymerization initiators may be employed singly or in combination of two or more species.

Examples of the chain transfer agent, which is optionally employed, include m-methylstyrene dimer.

Examples of the solvent employed for solution polymerization include hydrocarbon solvents such as toluene, xylene, cyclohexane, and methylcyclohexane; ester solvents such as ethyl acetate and methyl isobutyrate; ketone solvents such as acetone and methyl ethyl ketone; ether solvents such as tetrahydrofuran and dioxane; and alcohol solvents such as methanol and isopropanol.

Thermoplastic resin (B), which is employed in the thermoplastic transparent resin composition of the present invention, is obtained by hydrogenating 70% or more of aromatic double bonds of the aromatic-vinyl-monomer-derived structural unit of thermoplastic resin ($B_0$) produced by polymerization of a (meth)acrylic acid ester monomer and an aromatic vinyl monomer.

The solvent employed for the hydrogenation reaction may be the same as or different from the aforementioned solvent for polymerization. Examples of the solvent include hydrocarbon solvents such as cyclohexane and methylcyclohexane; ester solvents such as ethyl acetate and methyl isobutyrate; ketone solvents such as acetone and methyl ethyl ketone; ether solvents such as tetrahydrofuran and dioxane; and alcohol solvents such as methanol and isopropanol.

No particular limitation is imposed on the hydrogenation process, and any known process may be employed. For example, hydrogenation may be carried out through a batch-type or continuous flow-type process at a hydrogen pressure of 3 to 30 MPa and a reaction temperature of 60 to 250° C. When the reaction temperature is 60° C. or higher, the reaction does not require an excessively long period of time, whereas when the reaction temperature is 250° C. or lower, cleavage of a molecular chain or hydrogenation of an ester moiety is less likely to occur.

Examples of the catalyst employed for the hydrogenation reaction include solid catalysts formed by supporting a metal such as nickel, palladium, platinum, cobalt, ruthenium, or rhodium, an oxide of such a metal, a salt of such a metal, or a complex compound of such a metal, on a porous carrier such as carbon, alumina, silica, silica-alumina, or diatomaceous earth.

Thermoplastic resin (B) is obtained by hydrogenating 70% or more of aromatic double bonds of the aromatic-vinyl-monomer-derived structural unit of thermoplastic resin ($B_O$). That is, the amount of aromatic double bonds remaining in the aromatic-vinyl-monomer-derived structural unit is 30% or less. When the amount of the remaining aromatic double bonds exceeds 30%, the transparency of thermoplastic resin (B) may be lowered, resulting in poor transparency of the thermoplastic transparent resin composition. The amount of aromatic double bonds remaining in the aromatic-vinyl-monomer-derived structural unit is preferably less than 10%, more preferably less than 5%.

No particular limitation is imposed on the weight average molecular weight of thermoplastic resin (A). However, for improvement of strength and moldability, the weight average molecular weight is preferably 40,000 to 500,000, more preferably 50,000 to 300,000.

No particular limitation is imposed on the weight average molecular weight of thermoplastic resin (B). However, for improvement of strength and moldability, the weight average molecular weight is preferably 40,000 to 500,000, more preferably 50,000 to 300,000.

The aforementioned weight average molecular weight is determined, in terms of standard polystyrene, through gel permeation chromatography (GPC).

Blending of thermoplastic resin (A) and thermoplastic resin (B) may be carried out through melt-mixing by a method known in the art. For example, blending may be performed by means of a single-screw extruder, a twin-screw extruder, a kneader, or a similar apparatus.

No particular limitation is imposed on the blending proportions of thermoplastic resin (A) and thermoplastic resin (B). However, the ratio by mass of thermoplastic resin (A) to thermoplastic resin (B) is preferably 1/99 to 99/1, more preferably 5/95 to 95/5, much more preferably 10/90 to 90/10.

From the viewpoint of transparency, the thermoplastic transparent resin composition of the present invention is preferably a thermoplastic resin composition produced by blending thermoplastic resin (A) wherein the amount of the (meth)acrylic-acid-ester-monomer-derived structural unit represented by formula (1) is 15 to 65 mol % on the basis of the total amount of all the structural units of the resin (A), with thermoplastic resin (B) wherein the amount of the (meth)acrylic-acid-ester-monomer-derived structural unit represented by formula (1) is 55 to 80 mol % on the basis of the total amount of all the structural units of the resin (B).

Among the aforementioned ones, from the viewpoint of transparency, the thermoplastic resin composition of the present invention is more preferably a thermoplastic resin composition produced by blending thermoplastic resin (A) wherein the amount of the (meth)acrylic-acid-ester-monomer-derived structural unit represented by formula (1) is 15 to 35 mol %, preferably 15 to 25 mol %, on the basis of the total amount of all the structural units of the resin (A), with thermoplastic resin (B) wherein the amount of the (meth)acrylic-acid-ester-monomer-derived structural unit represented by formula (1) is 55 mol % or more and less than 65 mol % on the basis of the total amount of all the structural units of the resin (B); or a thermoplastic resin composition produced by blending thermoplastic resin (A) wherein the amount of the (meth)acrylic-acid-ester-monomer-derived structural unit represented by formula (1) is 15 to 65 mol %, preferably 15 to 55 mol %, on the basis of the total amount of all the structural units of the resin (A), with thermoplastic resin (B) wherein the amount of the (meth)acrylic-acid-ester-monomer-derived structural unit represented by formula (1) is 65 to 80 mol % on the basis of the total amount of all the structural units of the resin (B).

When any of the aforementioned combinations of thermoplastic resin (A) and thermoplastic resin (B) is employed, thermoplastic resin (A) and thermoplastic resin (B) exhibit high compatibility with each other, and the thermoplastic resin composition produced through blending of these resins exhibits particularly favorable transparency.

The thermoplastic transparent resin composition of the present invention may be blended with an additional resin, so long as the transparency of the composition is not impaired. Examples of the additional resin include polymethyl methacrylate, polystyrene, polycarbonate, cycloolefin (co)polymer, and various elastomers.

The thermoplastic transparent resin composition of the present invention may be mixed with any additive. Examples of the additive include an antioxidant, a UV absorbent, a coloration inhibitor, an antistatic agent, a release agent, a lubricant, a dye, and a pigment. No particular limitation is imposed on the method for mixing such an additive with the composition, and there may be employed, for example, a method in which the entire amount of the additive is compounded with the composition, a method in which an additive masterbatch is dry-blended with the composition, or a method in which the entire amount of the additive is dry-blended with the composition.

The thermoplastic transparent resin composition of the present invention exhibits a transparent appearance, since the composition effectively transmits rays of visible light. When the thermoplastic transparent resin composition of the present invention is molded into a product having a thickness of 3.2 mm, and the haze of the product is measured, the product preferably exhibits a haze of 5% or less, which may vary with the intended use of the composition. When the thermoplastic transparent resin composition is employed as an optical material, the composition may be required to exhibit further high transparency. In such a case, the haze is more preferably 3% or less, particularly preferably 2% or less, most preferably 1.8% or less.

The thermoplastic transparent resin composition of the present invention may be heat-melted and molded into a product having an intended shape. Molding of the composition may be carried out through a known technique such as injection molding or extrusion molding. Specific examples of applications of such a molded product include an extrusion-molded thermoplastic resin sheet formed of the thermoplastic transparent resin composition, a co-extrusion-molded multi-layer thermoplastic resin sheet including a layer formed of the thermoplastic transparent resin composition, a substrate formed of the thermoplastic resin sheet, a lens unit including the substrate and at least one lens formed on one surface or both surfaces of the substrate, a display front panel, a light guide plate, a light guide product, a plastic lens, an optical fiber, an optical filter, a prism, a transparent substrate material, a transparent protective material, an optical recording medium substrate, and an optical component.

EXAMPLES

The present invention will next be described in detail by way of examples, which should not be construed as limiting the invention thereto.

Thermoplastic transparent resin compositions produced in Examples and Comparative Examples were evaluated as described below.

<Measurement of Haze>

A disk-shaped sample having a size of 50 φ and a thickness of 3.2 mm was prepared by means of NP7-1F injection molding machine manufactured by Nissei Plastic Industrial Co., Ltd., and the haze of the sample was measured through the transmission method by means of COH-400 manufactured by Nippon Denshoku Industries Co., Ltd. A sample exhibiting a haze of 5% or less was regarded as being "transparent."

<Proportions by Mole of Structural Units of Copolymer>

The proportions by mole of structural units were calculated on the basis of $^1$H-NMR measurement data (400 MHz, solvent: $CDCl_3$) obtained by means of JNM-AL400 manufactured by JEOL Ltd.

<Percent Hydrogenation of Copolymer>

The percent hydrogenation of a copolymer was determined on the basis of the percent reduction in absorbance at 260 nm as determined through UV spectrophotometry performed before and after hydrogenation reaction of the copolymer. Specifically, the percent hydrogenation of a resin was calculated by use of the following formula:

$$\text{percent hydrogenation} = 100 \times [1 - (A2 \times C1)/(A1 \times C2)],$$

wherein C1 represents the concentration of the resin before hydrogenation reaction; A1 represents the absorbance corresponding to the concentration C1; C2 represents the concentration of the resin after hydrogenation reaction; and A2 represents the absorbance corresponding to the concentration C2.

<Measurement of Refractive Index>

The disk-shaped sample prepared for haze measurement was subjected to cutting by means of REFINE SAW, Lo manufactured by Refinetec Co., Ltd., to thereby prepare a sample having a length of 40 mm, a width of 8 mm, and a thickness of 3.2 mm. The refractive index of the sample was measured by means of multi-wavelength Abbe refractometer DR-M2 manufactured by Atago Co., Ltd. at a temperature of 20° C. and a wavelength of 589 nm by use of monobromonaphthalene as a contact liquid.

Synthesis Example 1 [Production of methyl methacrylate-styrene copolymer resin (thermoplastic resin A1)]

A monomer composition containing purified methyl methacrylate (product of Mitsubishi Gas Chemical Company, Inc.) serving as a monomer component in an amount of 60.000 mol %, purified styrene (product of Wako Pure Chemical Industries, Ltd.) serving as a monomer component in an amount of 39.998 mol %, and t-amyl peroxy-2-ethylhexanoate (trade name: Luperox 575, product of Arkema Yoshitomi, Ltd.) serving as a polymerization initiator in an amount of 0.002 mol % was continuously supplied to a 10-L complete mixing vessel equipped with a helical ribbon blade at a rate of 1 kg/h, and continuous polymerization was carried out under the following conditions: average residence time: 2.5 hours, polymerization temperature: 150° C. A portion of the reaction mixture was continuously removed through the bottom of the polymerization vessel so that the liquid level of the polymerization vessel was maintained constant, and the thus-removed reaction mixture was fed to a solvent-removing apparatus, to thereby produce a pellet-form methyl methacrylate-styrene copolymer resin (thermoplastic resin A1). Thermoplastic resin A1 was found to contain a methyl-methacrylate-derived structural unit in an amount of 57 mol %. Thermoplastic resin A1 was found to have a weight average molecular weight (as reduced to standard polystyrene) of 147,000 as determined through gel permeation chromatography.

Synthesis Example 2 [Production of Methyl Methacrylate-Styrene-Vinylcyclohexane Copolymer Resin (Thermoplastic Resin B1)]

Thermoplastic resin A1 produced in Synthesis Example 1 was dissolved in methyl isobutyrate (product of Kanto Chemical Co., Inc.), to thereby prepare a 10 mass % methyl isobutyrate solution. To a 1,000-mL autoclave apparatus were added the 10 mass % methyl isobutyrate solution of thermoplastic resin A1 in an amount of 500 parts by mass, and 10 mass % Pd/C (product of N.E. Chemcat Corporation) serving as a hydrogenation catalyst in an amount of 1 part by mass. The resultant mixture was retained in the apparatus at a hydrogen pressure of 9 MPa and 200° C. for 15 hours, to thereby carry out hydrogenation on aromatic double bonds of the styrene moiety of thermoplastic resin A1. The percent hydrogenation of the styrene moiety was found to be 99%. The hydrogenation catalyst was removed by means of a filter, and the resultant product was fed to a solvent-removing apparatus, to thereby produce a pellet-form methyl methacrylate-styrene-vinylcyclohexane copolymer resin (thermoplastic resin B1). Thermoplastic resin B1 was found to contain a methyl-methacrylate-derived structural unit in an amount of 57 mol %.

Synthesis Example 3 [Production of Methyl Methacrylate-Styrene Copolymer Resin (Thermoplastic Resin A2)]

Continuous polymerization was carried out under the same conditions as Synthesis Example 1, except that purified methyl methacrylate and purified styrene were employed as monomer components in amounts of 75.000 mol % and 24.998 mol %, respectively, to thereby produce thermoplastic resin A2. Thermoplastic resin A2 was found to contain a methyl-methacrylate-derived structural unit in an amount of 73 mol %. Thermoplastic resin A2 was found to have a weight average molecular weight (as reduced to standard polystyrene) of 124,000 as determined through gel permeation chromatography.

Synthesis Example 4 [Production of Methyl Methacrylate-Styrene-Vinylcyclohexane Copolymer Resin (Thermoplastic Resin B2)]

Under the same conditions as Synthesis Example 2, hydrogenation was carried out on aromatic double bonds of the styrene moiety of thermoplastic resin A2 produced in Synthesis Example 3. The percent hydrogenation of the styrene moiety was found to be 99%. The thus-produced methyl methacrylate-styrene-vinylcyclohexane copolymer resin (thermoplastic resin B2) was found to contain a methyl-methacrylate-derived structural unit in an amount of 73 mol %.

Synthesis Example 5 [Production of Methyl Methacrylate-Styrene Copolymer (Resin Thermoplastic Resin A3)]

A monomer composition containing purified methyl methacrylate serving as a monomer component in an amount of 20.000 mol %, purified styrene serving as a monomer component in an amount of 79.998 mol %, and t-amyl peroxy-2-ethylhexanoate serving as a polymerization initiator in an amount of 0.002 mol % was continuously supplied to a 10-L complete mixing vessel equipped with a helical ribbon blade at a rate of 1 kg/h, and continuous polymerization was carried out under the following conditions: average residence time: 2.5 hours, polymerization temperature: 150° C. A portion of the reaction mixture was continuously removed through the bottom of the polymerization vessel so that the liquid level of the polymerization vessel was maintained constant, and the thus-removed reaction mixture was fed to a solvent-removing apparatus, to thereby produce a pellet-form methyl methacrylate-styrene copolymer resin (thermoplastic resin A3). Thermoplastic resin A3 was found to contain a methyl-methacrylate-derived structural unit in an amount of 20 mol %. Thermoplastic resin A3 was found to have a weight average molecular weight (as reduced to standard polystyrene) of 225,000 as determined through gel permeation chromatography.

Synthesis Example 6 [Production of Methyl Methacrylate-Styrene Copolymer Resin (Thermoplastic Resin A4)]

Continuous polymerization was carried out under the same conditions as Synthesis Example 5, except that purified methyl methacrylate and purified styrene were employed as monomer components in amounts of 30.000 mol % and 69.998 mol %, respectively, to thereby produce a methyl methacrylate-styrene copolymer resin (thermoplastic resin A4). Thermoplastic resin A4 was found to contain a methyl-methacrylate-derived structural unit in an amount of 29 mol %. Thermoplastic resin A4 was found to have a weight average molecular weight (as reduced to standard polystyrene) of 171,000 as determined through gel permeation chromatography.

Synthesis Example 7 [Production of Methyl Methacrylate-Styrene Copolymer Resin (Thermoplastic Resin A5)]

Continuous polymerization was carried out under the same conditions as Synthesis Example 5, except that purified methyl methacrylate and purified styrene were employed as monomer components in amounts of 50.000 mol % and 49.998 mol %, respectively, to thereby produce a methyl methacrylate-styrene copolymer resin (thermoplastic resin A5). Thermoplastic resin A5 was found to contain a methyl-methacrylate-derived structural unit in an amount of 48 mol %. Thermoplastic resin A5 was found to have a weight average molecular weight (as reduced to standard polystyrene) of 148,000 as determined through gel permeation chromatography.

Table 1 shows a list of thermoplastic resins produced in Synthesis Examples 1 to 7.

Examples 1-1 to 1-3

A thermoplastic resin composition prepared through dry-blending of thermoplastic resin A3 and thermoplastic resin B1 in proportions by mass of 10:90, 50:50, or 90:10 was fed to a unidirectional twin-screw extruder having a screw size of 25 mm, and the resin composition was extruded under kneading at a cylinder temperature of 250° C. and a discharge rate of 5 kg/h. The resultant resin composition was subjected to injection molding, to thereby form a sample, and the haze and refractive index of the sample were measured. The results are shown in Table 2.

FIG. 1 shows the relationship between refractive index and the blending proportions of thermoplastic resins A3 and B1.

Examples 2-1 to 2-3

Thermoplastic resin A3 and thermoplastic resin B2 were employed, and extrusion was carried out under the same conditions as Examples 1-1 to 1-3. The resultant resin composition was subjected to injection molding, to thereby form a sample, and the haze and refractive index of the sample were measured. The results are shown in Table 2.

Examples 3-1 to 3-3

Thermoplastic resin A4 and thermoplastic resin B2 were employed, and extrusion was carried out under the same conditions as Examples 1-1 to 1-3. The resultant resin composition was subjected to injection molding, to thereby form a sample, and the haze and refractive index of the sample were measured. The results are shown in Table 2.

Examples 4-1 to 4-3

Thermoplastic resin A5 and thermoplastic resin B2 were employed, and extrusion was carried out under the same conditions as Examples 1-1 to 1-3. The resultant resin composition was subjected to injection molding, to thereby form a sample, and the haze and refractive index of the sample were measured. The results are shown in Table 2.

Example 5

Thermoplastic resin A4 and thermoplastic resin B1 were employed in proportions by mass of 10:90, and extrusion was carried out under the same conditions as Example 1-1.

TABLE 1

| Synthesis Example | 1 | 2 | 3 | 4 | 5 | 6 | 7 |
|---|---|---|---|---|---|---|---|
| Thermoplastic resin | A1 | B1 | A2 | B2 | A3 | A4 | A5 |
| Methyl-methacrylate-derived structural unit (mol %) | 57 | 57 | 73 | 73 | 20 | 29 | 48 |
| Styrene-derived structural unit (mol %) | 43 | 43 | 27 | 27 | 80 | 71 | 52 |
| Weight average molecular weight | 147,000 | 147,000 | 124,000 | 124,000 | 225,000 | 171,000 | 148,000 |
| Percent hydrogenation of aromatic double bonds (%) | — | 99 | — | 99 | — | — | — |

The resultant resin composition was subjected to injection molding, to thereby form a sample, and the haze and refractive index of the sample were measured. The results are shown in Table 2.

Example 6

Thermoplastic resin A1 and thermoplastic resin B2 were employed in proportions by mass of 90:10, and extrusion was carried out under the same conditions as Example 1-3. The resultant resin composition was subjected to injection molding, to thereby form a sample, and the haze and refractive index of the sample were measured. The results are shown in Table 2.

Comparative Examples 1-1 to 1-3

Acrypet VH5 (polymethyl methacrylate, product of Mitsubishi Rayon Co., Ltd.) and thermoplastic resin B1 were employed, and extrusion was carried out under the same conditions as Examples 1-1 to 1-3. The resultant resin composition was subjected to injection molding, to thereby form a sample, and the haze of the sample was measured. The results are shown in Table 3.

Comparative Examples 2-1 to 2-3

ZEONEX 330R (cyclo-olefin polymer, product of Zeon Corporation) and thermoplastic resin B1 were employed, and extrusion was carried out under the same conditions as Examples 1-1 to 1-3. The resultant resin composition was subjected to injection molding, to thereby form a sample, and the haze of the sample was measured. The results are shown in Table 3.

Comparative Examples 3-1 to 3-3

ZEONEX 480R (cyclo-olefin polymer, product of Zeon Corporation) and thermoplastic resin B1 were employed, and extrusion was carried out under the same conditions as Examples 1-1 to 1-3. The resultant resin composition was subjected to injection molding, to thereby form a sample, and the haze of the sample was measured. The results are shown in Table 3.

Comparative Examples 4-1 to 4-3

TOPAS 5013L-10 (cyclo-olefin copolymer, product of Polyplastics Co., Ltd.) and thermoplastic resin B1 were employed, and extrusion was carried out under the same conditions as Examples 1-1 to 1-3. The resultant resin composition was subjected to injection molding, to thereby form a sample, and the haze of the sample was measured. The results are shown in Table 3.

In Table 3, "Turbid" corresponds to a highly turbid sample.

TABLE 2

| | | Example | | | | | | | | | | | | | |
|---|---|---|---|---|---|---|---|---|---|---|---|---|---|---|---|
| | | 1-1 | 1-2 | 1-3 | 2-1 | 2-2 | 2-3 | 3-1 | 3-2 | 3-3 | 4-1 | 4-2 | 4-3 | 5 | 6 |
| Thermo- | A1 | — | — | — | — | — | — | — | — | — | — | — | — | — | 90 |
| plastic | A3 | 10 | 50 | 90 | — | — | — | — | — | — | — | — | — | — | — |
| resin (A) | A4 | — | — | — | 10 | 50 | 90 | 10 | 50 | 90 | — | — | — | 10 | — |
| wt % | A5 | — | — | — | — | — | — | — | — | — | 10 | 50 | 90 | — | — |
| Thermo- | B1 | 90 | 50 | 10 | — | — | — | — | — | — | — | — | — | 90 | — |
| plastic | B2 | — | — | — | 90 | 50 | 10 | 90 | 50 | 10 | 90 | 50 | 10 | — | 10 |
| resin (B) wt % | | | | | | | | | | | | | | | |
| Haze (%) | | 0.7 | 1.4 | 1.2 | 1.6 | 1.4 | 0.9 | 0.5 | 0.4 | 1.2 | 0.4 | 0.4 | 0.6 | 3.9 | 2.0 |
| Refractive index | | 1.504 | 1.534 | 1.565 | 1.504 | 1.535 | 1.564 | 1.503 | 1.529 | 1.556 | 1.501 | 1.520 | 1.538 | 1.503 | 1.528 |

TABLE 3

| | | Comparative Example | | | | | | | | | | | |
|---|---|---|---|---|---|---|---|---|---|---|---|---|---|
| | | 1-1 | 1-2 | 1-3 | 2-1 | 2-2 | 2-3 | 3-1 | 3-2 | 3-3 | 4-1 | 4-2 | 4-3 |
| Thermo- | Acrypet VH5 | 10 | 50 | 90 | — | — | — | — | — | — | — | — | — |
| plastic | ZEONEX 330R | — | — | — | 10 | 50 | 90 | — | — | — | — | — | — |
| resin | ZEONEX 480R | — | — | — | — | — | — | 10 | 50 | 90 | — | — | — |
| wt % | TOPAS 5013L-10 | — | — | — | — | — | — | — | — | — | 10 | 50 | 90 |
| Thermo- plastic resin (B) wt % | B1 | 90 | 50 | 10 | 90 | 50 | 10 | 90 | 50 | 10 | 90 | 50 | 10 |
| Haze (%) | | 7.2 | 18.5 | 10.5 | 73.1 | Turbid | 56.8 | Turbid | Turbid | Turbid | Turbid | Turbid | Turbid |

As shown in Table 2, each of the thermoplastic transparent resin compositions of Examples 1 to 6, which is produced through blending of specific thermoplastic resin (A) and thermoplastic resin (B), exhibits high transparency. Also, as shown in FIG. 1, the refractive index of a thermoplastic resin composition is readily adjusted by varying the blending proportions of thermoplastic resin (A) and thermoplastic resin (B).

In contrast, as shown in Table 3, each of the thermoplastic resin compositions of Comparative Examples 1 to 4, which is produced through blending of thermoplastic resin (B) and a resin other than thermoplastic resin (A), exhibits low transparency.

INDUSTRIAL APPLICABILITY

The thermoplastic transparent resin composition of the present invention exhibits high transparency, although the resin composition is produced through blending of different thermoplastic resins. The refractive index of the resin composition can be readily adjusted by appropriately varying the blending proportions of the resins. By virtue of these characteristic features, the thermoplastic transparent resin composition is suitably applied to, for example, a display front panel, a light guide plate, a light guide product, a plastic lens, an optical fiber, an optical filter, a prism, a transparent substrate material, a transparent protective material, an optical recording medium substrate, and an optical component.

The invention claimed is:

1. A method for producing a thermoplastic transparent resin composition comprising a thermoplastic resin (A) and a thermoplastic resin (B) by blending the resins (A) and (B) in a ratio of mass of the resin (A) to the resin (B) of from 10/90 to 90/10:

the thermoplastic resin (A) being a thermoplastic resin comprising a methyl methacrylate structural unit and a styrene structural unit, wherein the amount of the methyl methacrylate structural unit of the resin (A) is 25 to 35 mol % on the basis of the total amount of all the structural units of the resin (A); and the thermoplastic resin (B) obtained by hydrogenating 95% or more of aromatic double bonds of styrene structural unit of a thermoplastic resin which comprises a methyl methacrylate structural unit and the styrene structural unit, wherein the amount of the methyl methacrylate structural unit of the resin (B) is 55 to 73 mol % on the basis of the total amount of all the structural units of the resin (B);

wherein a piece molded from the composition and having a thickness of 3.2 mm exhibits a haze of 5% or less as measured through the transmission method.

2. The method according to claim 1, which comprises the amount of the methyl methacrylate structural unit of the resin (B) 55 mol % to less than 65 mol % on the basis of the total amount of all the structural units of the resin (B).

* * * * *